(12) United States Patent
Nagano et al.

(10) Patent No.: US 10,700,596 B2
(45) Date of Patent: Jun. 30, 2020

(54) POWER SUPPLY CIRCUIT

(71) Applicant: OMRON Corporation, Kyoto-shi, Kyoto (JP)

(72) Inventors: Masaaki Nagano, Kusatsu (JP); Kohei Tanino, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/521,643

(22) Filed: Jul. 25, 2019

(65) Prior Publication Data

US 2020/0044560 A1   Feb. 6, 2020

(30) Foreign Application Priority Data

Aug. 3, 2018 (JP) ................................ 2018-146674
May 14, 2019 (JP) ................................ 2019-091083

(51) Int. Cl.
*H02H 7/125* (2006.01)
*H02M 1/32* (2007.01)
*H02M 3/155* (2006.01)
*H02M 7/06* (2006.01)

(52) U.S. Cl.
CPC ............. *H02M 1/32* (2013.01); *H02M 3/155* (2013.01); *H02M 7/06* (2013.01)

(58) Field of Classification Search
CPC .......... H02M 1/32; H02M 3/155; H02M 7/06; H02H 9/04; H02H 7/125; H02H 9/005
USPC ............ 363/48, 49, 52, 53, 84, 89; 323/222, 323/224, 272, 282–288, 299; 361/56, 57, 361/118, 120, 291
See application file for complete search history.

(56) References Cited

U.S. PATENT DOCUMENTS

| | | | | |
|---|---|---|---|---|
| 4,573,113 A | * | 2/1986 | Bauman | H02M 5/45 363/37 |
| 5,596,465 A | * | 1/1997 | Honda | G05F 1/573 323/284 |
| 6,137,241 A | * | 10/2000 | Gyoten | H05B 41/046 315/209 R |
| 7,889,526 B2 | * | 2/2011 | Baby | H05B 39/08 323/288 |

(Continued)

FOREIGN PATENT DOCUMENTS

| | | |
|---|---|---|
| EP | 1835609 A1 | 9/2007 |
| EP | 2456060 A1 | 5/2012 |

OTHER PUBLICATIONS

Jiro Togawa, "Practical Power Supply Circuit Design Handbook", Aug. 1, 2003, pp. 92 to 93, the 22nd edition, CQ Publishing Co., Ltd., Concise explanation of relevance provided in the specification.

(Continued)

*Primary Examiner* — Rajnikant B Patel
(74) *Attorney, Agent, or Firm* — Metrolex IP Law Group, PLLC (57) ABSTRACT

A power supply circuit includes: a coil having a first end that receives an input voltage and a second end; a transistor connected to the second end of the coil; a first capacitor connected to the second end of the coil; and a surge protection circuit connected to the second end of the coil in parallel with the first capacitor. The surge protection circuit includes a diode, a second capacitor, and a resistance. The diode, the second capacitor, and the resistance are connected in series to the second end of the coil.

14 Claims, 8 Drawing Sheets

(56) References Cited

U.S. PATENT DOCUMENTS

| | | | |
|---|---|---|---|
| 8,929,107 B2* | 1/2015 | Kang | H02H 9/04 |
| | | | 361/118 |
| 2001/0005322 A1 | 6/2001 | Uchida | |
| 2016/0276923 A1 | 9/2016 | Hayakawa et al. | |

OTHER PUBLICATIONS

An extended European search report (EESR) dated Dec. 10, 2019 in a related EP application.

* cited by examiner

POWER SUPPLY CIRCUIT

BACKGROUND OF THE INVENTION

Field of the Invention

The present invention relates to a power supply circuit, and particularly to a step-down chopper.

Description of the Background Art

A step-down chopper is one type of a direct-current (DC)-DC converter. In the step-down chopper, an input voltage is directly switched by a switching element. The DC input voltage is converted by the switching element into high-frequency electric power. The converted voltage is again converted into a DC voltage by a smoothing choke coil and a smoothing capacitor (see pages 92 to 93 in "Practical Power Supply Circuit Design Handbook" (the 22nd edition) by Jiro Togawa, CQ Publishing Co., Ltd., August 2003).

SUMMARY OF THE INVENTION

At the start-up of the operation of a step-down chopper, a switching element interrupts the flow of a current. Thus, the current flows into a smoothing capacitor. When a high current instantaneously flows into a choke coil, the voltage on the smoothing capacitor leaps up to the level more than expected. Since the smoothing capacitor and the switching element are connected to each other, such instantaneous voltage rise may damage the switching element.

In order to prevent damage to the switching element, an element for countermeasures against surge (typically, a Zener diode) needs to be inserted into a circuit. In order to protect the switching element, the operating voltage of the element for countermeasures against surge needs to be set to be lower than the rated voltage of the switching element. However, when the operating voltage of the element for countermeasures against surge is set to be relatively low, the element for countermeasures against surge may operate also during the normal operation of the step-down chopper.

When the element for countermeasures against surge is used alone, its operating voltage needs to be higher than the voltage during the normal operation of the step-down chopper, and also needs to be lower than the rated voltage of the switching element. However, a circuit element generally has characteristic variations. Thus, the operating voltage of the element for countermeasures against surge can also he ensured only within a specific range. When the actual operating voltage of the element for countermeasures against surge exceeds the rated voltage of the switching element, the switching element may be damaged.

An object of the present invention is to provide a power supply circuit that allows a switching element to be more reliably protected from a surge voltage.

According to an example of the present disclosure, a power supply circuit includes: a coil having a first end that receives an input voltage and a second end; a switching element connected to the second end of the coil; a first capacitor connected to the second end of the coil; and a surge protection circuit connected to the second end of the coil in parallel with the first capacitor. The surge protection circuit includes a diode, a second capacitor, and a resistance. The diode, the second capacitor, and the resistance are connected in series to the second end of the coil.

According to the above-described configuration, a power supply circuit allowing a switching element to be more reliably protected from a surge voltage can be provided. When a surge occurs, a current flows into the first capacitor and the second capacitor. This allows absorption of the surge. Since the current flowing into the second capacitor is limited by the resistance, occurrence of an inrush current can be prevented. Thereby, a voltage rise at the second end of the coil can be suppressed. Since the voltage at the second end of the coil is applied to the switching element, the switching element can be more reliably protected from a surge voltage. The surge protection circuit further includes a diode. By utilizing the current/voltage characteristics of the diode, the circuit element in the power supply circuit can be protected, or the power supply circuit can be operated with stability.

In the above-described power supply circuit, the second capacitor is larger in capacitance than the first capacitor.

According to the above-described configuration, even when the input voltage rises to thereby increase the current, the increased current flows into the second capacitor as long as the second capacitor is chargeable. Accordingly, a voltage rise across the Zener diode (between the cathode and the anode) can be suppressed, so that the Zener diode can be protected.

In the above-described power supply circuit, the diode is a Zener diode. The Zener diode has a cathode electrically connected to the second end of the coil. The second capacitor and the resistance are connected in series to an anode of the Zener diode.

According to the above-described configuration, when the voltage of the first capacitor (that is, the voltage at the second end of the coil) exceeds the operating voltage of the Zener diode, the Zener diode operates. The current flows into the Zener diode and the current also flows into the second capacitor. This allows absorption of a surge.

In the above-described power supply circuit, an operating voltage of the Zener diode is lower than a rated voltage of the switching element.

According to the above-described configuration, the voltage exceeding the rated voltage of the switching element can be prevented from being applied to the switching element. It should be noted that the "operating voltage of the Zener diode" may be interchangeable with a "breakdown voltage" or a "Zener voltage".

In the above-described power supply circuit, an operating voltage of the Zener diode exceeds a design value of the input voltage.

According to the above-described configuration, the Zener diode can be prevented from erroneously operating during the normal operation of the power supply circuit.

In the above-described power supply circuit, the diode has an anode connected to the second end of the coil.

According to the above-described configuration, charging and discharging of the second capacitor can be suppressed during the steady operation of the power supply circuit. This can consequently prevent the surge protection circuit from influencing the operation of the power supply circuit. Furthermore, the loss caused by charging and discharging of the second capacitor can also be suppressed.

In the above-described power supply circuit, the diode has an anode connected to the second end of the coil. The surge protection circuit further includes a Zener diode. The Zener diode, the second capacitor and the resistance are connected in series to a cathode of the diode.

According to the above-described configuration, charging and discharging of the second capacitor can be suppressed during the steady operation of the power supply circuit. Furthermore, the loss in the second capacitor can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

BRIEF DESCRIPTION OF THE DRAWINGS

In the following, the present embodiment will be described in detail with reference to the accompanying drawings, in which the same or corresponding components are designated by the same reference characters.

Application Example

Figure 1:
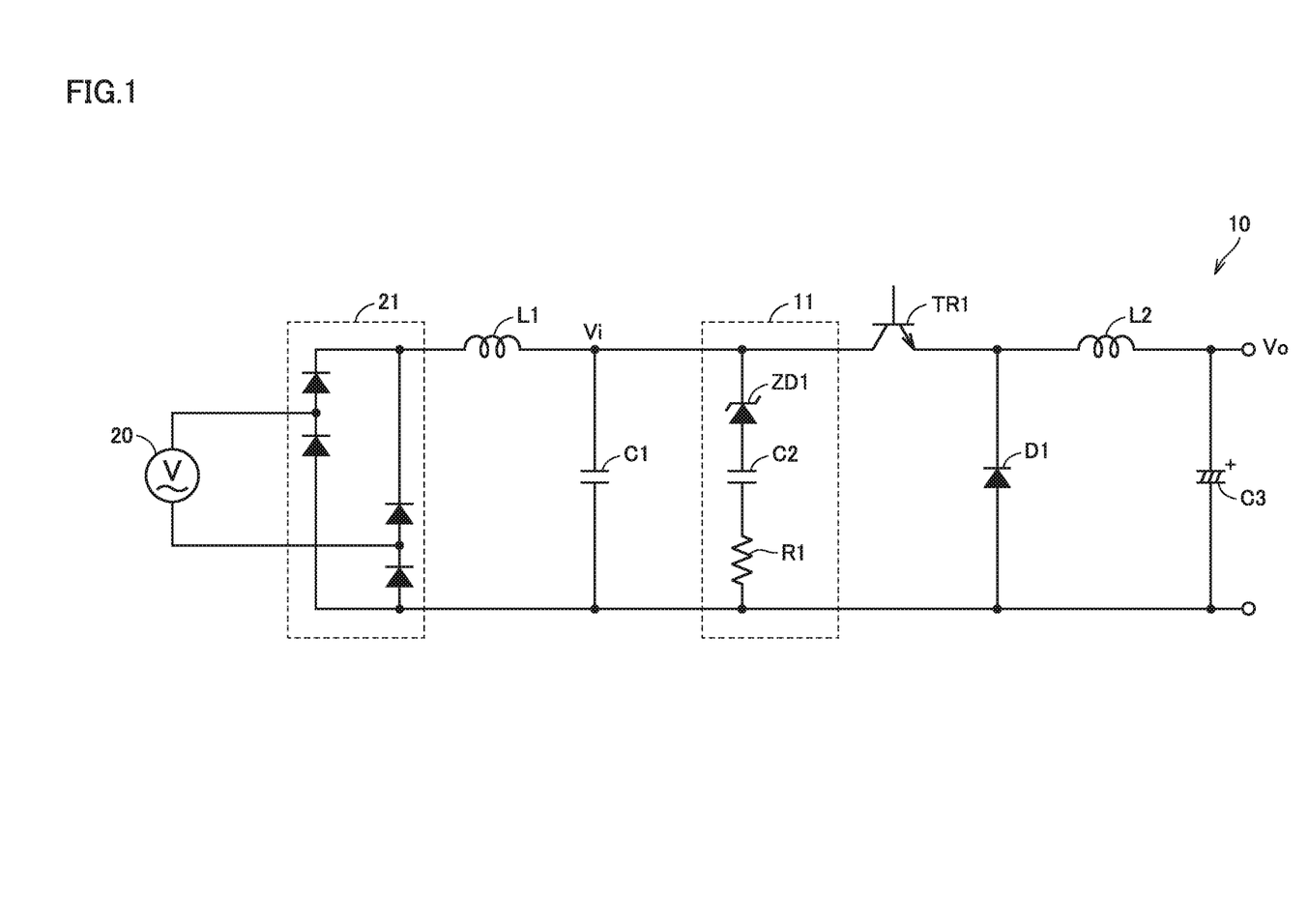
FIG. 1 is a block diagram showing a first configuration example of a power supply circuit according to the present embodiment.

First, an explanation will be hereinafter given with reference to FIG. 1 with regard to an example of the situation in which the present invention is applied. FIG. 1 is a block diagram showing a first configuration example of a power supply circuit 10 according to the present embodiment. As shown in FIG. 1, power supply circuit 10 is a step-down chopper. The alternating-current (AC) voltage from an AC power supply 20 is rectified by a rectifier circuit 21. Thereby, a DC voltage is input into power supply circuit 10.

Power supply circuit 10 includes a coil L1, a capacitor C1 (the first capacitor), a Zener diode ZD1, a capacitor C2 (the second capacitor), a resistance R1, a transistor TR1, a diode D1, a coil L2, and a capacitor C3. Coil L1 and capacitor C1 serve to smooth the voltage that is input into power supply circuit 10. Transistor TR1. serves as a switching element that switches the input voltage.

Coil L1 has a first end connected to rectifier circuit 21 and receiving the DC input voltage. Transistor TR1 has a high-voltage side terminal (for example, corresponding to a collector in the case of an NPN transistor) connected to the second end of coil L1. Transistor TR1 has a low-voltage side terminal (an emitter in the case of an NPN transistor) connected to the first end of coil L2. The second end of coil L2 is connected to the output terminal and the first end of capacitor C3.

The DC voltage input into power supply circuit 10 is converted by transistor TR1 into high-frequency electric power. The converted voltage is again converted into a DC voltage (a voltage Vo) by coil L2 and capacitor C3. Although not shown in FIG. 1, switching of transistor TR1 is controlled by a control circuit.

Diode D1 is a flywheel diode and causes the energy stored in coil L2 to circulate while transistor TR1 is OFF. Thus, the anode of diode D1 is connected to the second end of capacitor C3. Also, the cathode of diode D1 is connected to the first end of coil L2 and the low-voltage side terminal of transistor TR1.

Surge protection circuit 11 includes a diode, a second capacitor, and a resistance. In the first configuration example, the diode of surge protection circuit 11 is a Zener diode. The diode, the second capacitor, and the resistance are connected in series to the second end of coil L1. Specifically, Zener diode ZD1, capacitor C2, and resistance R1 constitute surge protection circuit 11. Surge protection circuit 11 is connected to the second end of coil L1 in parallel with capacitor C1. The cathode of Zener diode ZD1 is connected to the second end of coil L1. Capacitor C2 and resistance R1 are connected in series to the anode of Zener diode ZD1. In FIG. 1, the first end of capacitor C2 is connected to the anode of Zener diode ZD1 while the first end of resistance R1 is connected to the second end of capacitor C2. The second end of resistance R1, the second end of capacitor C1, the anode of diode D1, and the second end of capacitor C3 are connected to a common line (a reference voltage line). Also, the first end of resistance R1 may be connected to the anode of Zener diode ZD1, and capacitor C2 may be connected to the second end of resistance R1.

At the start-up of power supply circuit 10, a current flows through coil L1 and capacitor C1 is charged. Since transistor TR1 is stopped, the current flows into capacitor C1, so that the voltage of capacitor C1 rises. When a voltage V1 reaches the operating voltage of Zener diode ZD1, the current flows through Zener diode ZD1, so that capacitor C2 is charged. The operating voltage of Zener diode ZD1 is higher than the input voltage of power supply circuit 10 and lower than the rated voltage of transistor TR1. When the current flows through Zener diode ZD1, voltage V1 is maintained to be equal to or less than the rated voltage of transistor TR1, with the result that transistor TR1 can be protected.

Furthermore, resistance R1 prevents an excessively high current such as an inrush current from flowing through Zener diode ZD1 and capacitor C2. Thereby, voltage V1 is prevented from instantaneously rising. In other words, occurrence of a surge voltage in capacitor C1 can be suppressed Accordingly, the switching element (transistor TR1) can be more reliably protected from a surge voltage. In the following, surge protection by surge protection circuit 11 will be described in detail.

<Basic Configuration of Step-Down Chopper>

Figure 2:
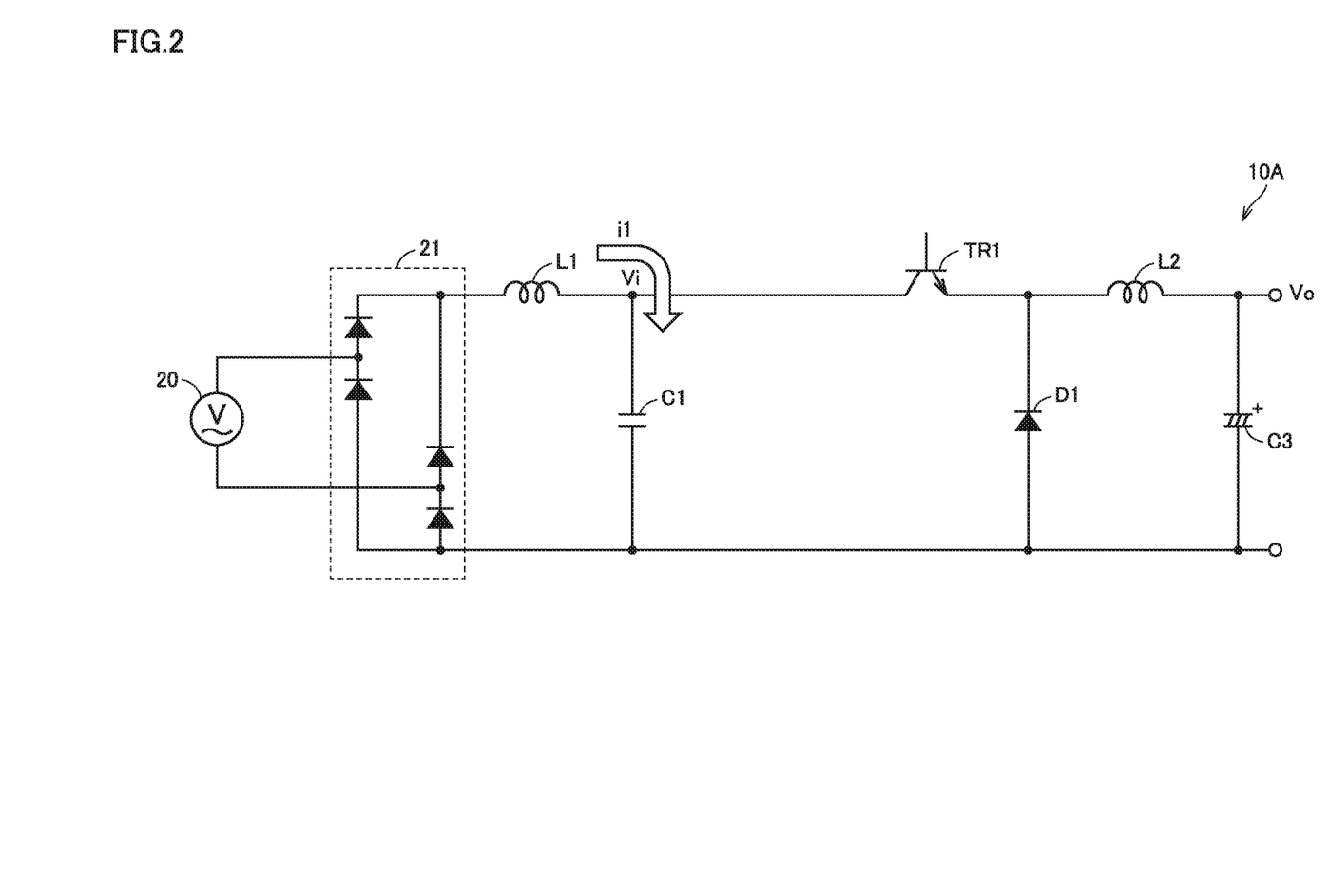
FIG. 2 is a circuit diagram showing the basic configuration of the power supply circuit shown in FIG. 1.

FIG. 2 is a circuit diagram showing the basic configuration of power supply circuit 10 shown in FIG. 1. A power supply circuit 10A shown in FIG. 2 is different from power supply circuit 10 in that surge protection circuit 11 is not provided.

Figure 3:
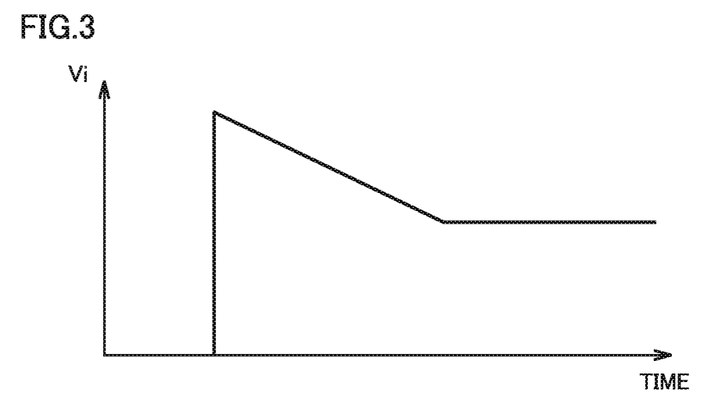
FIG. 3 is a diagram showing a schematic waveform of a surge voltage that may occur in the power supply circuit shown in FIG. 1.

At the start-up of power supply circuit 10A, a current i1 flows through coil L1 for charging capacitor C1. Current i1 in this case is an instantaneously high current (that is, an inrush current). Since transistor TR1 is off, current i1 flows into capacitor C1. When current i1 instantaneously increases, the voltage on coil L1, that is, the voltage across capacitor C1 (voltage Vi), suddenly rises as shown in FIG. 3.

Voltage Vi is applied to transistor TR1. Thus, when voltage Vi exceeds the rated voltage of transistor TR1, transistor TR1 is damaged. The surge voltage of capacitor C1 may be a cause of damage to transistor TR1.

In order to suppress a sudden rising voltage (that is, a surge voltage), a surge protection circuit is generally used. Typically, a Zener diode is used as a surge protection element.

Figure 4:
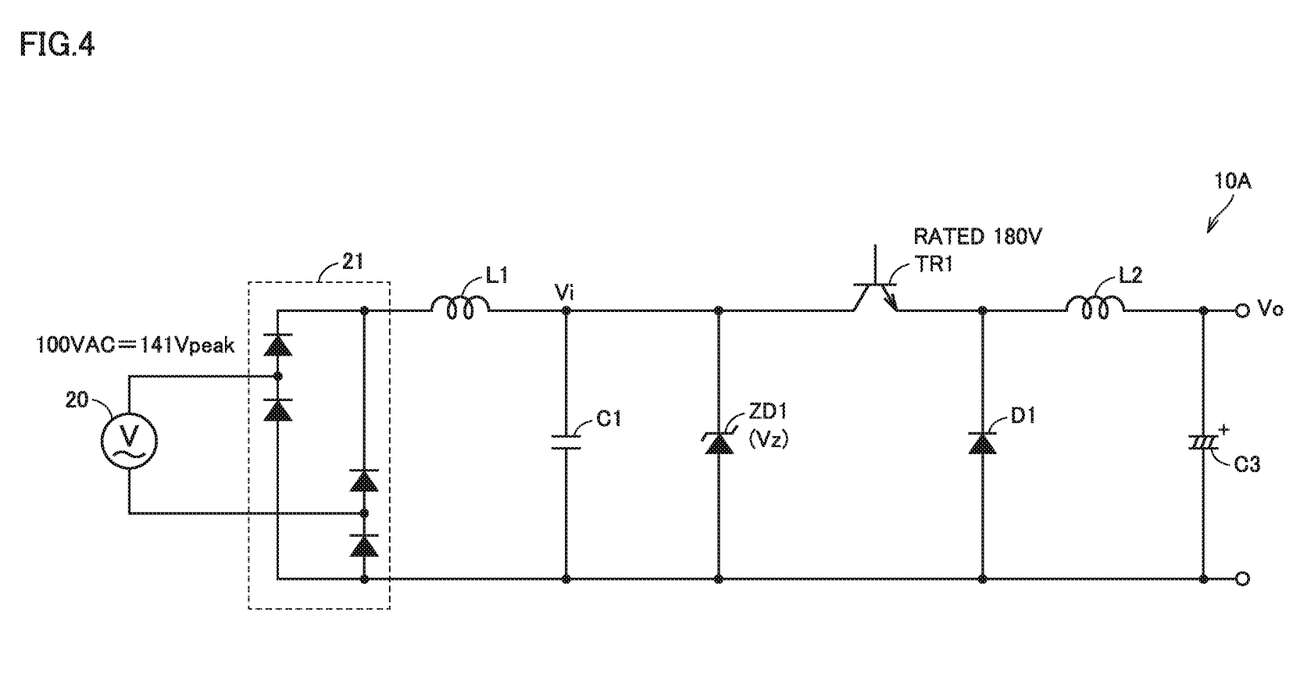
FIG. 4 is a circuit diagram showing an example of a step-down chopper shown in FIG. 2 for which commonly-used surge countermeasures are taken.

FIG. 4 is a circuit diagram showing an example of a step-down chopper shown in FIG. 2 for which commonly-used surge countermeasures are taken. As shown in FIG. 4, Zener diode ZD1 is provided in parallel with capacitor C1. Zener diode ZD1 should not operate during the normal operation of power supply circuit 10A. Thus, the operating voltage of Zener diode ZD1 should be higher than the design value of the input voltage. On the other hand, in order to protect transistor TR1, the operating voltage of Zener diode ZD1 should be lower than the rated voltage of transistor TR1.

From a point of view of the efficiency of power supply circuit 10A, it is desirable to reduce the loss during switching of transistor TR1 as much as possible. Generally, in the transistor with low switching loss, the rated voltage is also low. However, when the rated voltage of transistor TR1 is low, the difference between the input voltage during the normal operation of power supply circuit 10A. and the rated voltage of transistor TR1 is relatively small. For example, when the voltage of AC power supply 20 is 100 VAC, a peak voltage Vpeak (and the voltage after rectification) is 141 V. Thus, the input voltage during the normal operation of power supply circuit 10A (voltage Vi) is 141 V. In the case of power supply circuit 10A shown in FIG. 4, the operating voltage of Zener diode ZD1 should be 180 V higher than 141 V.

However, when the difference between the input voltage during the normal operation of power supply circuit 10A and the rated voltage of transistor TR1 is small, the problem as described below may occur, for example.

Figure 5:
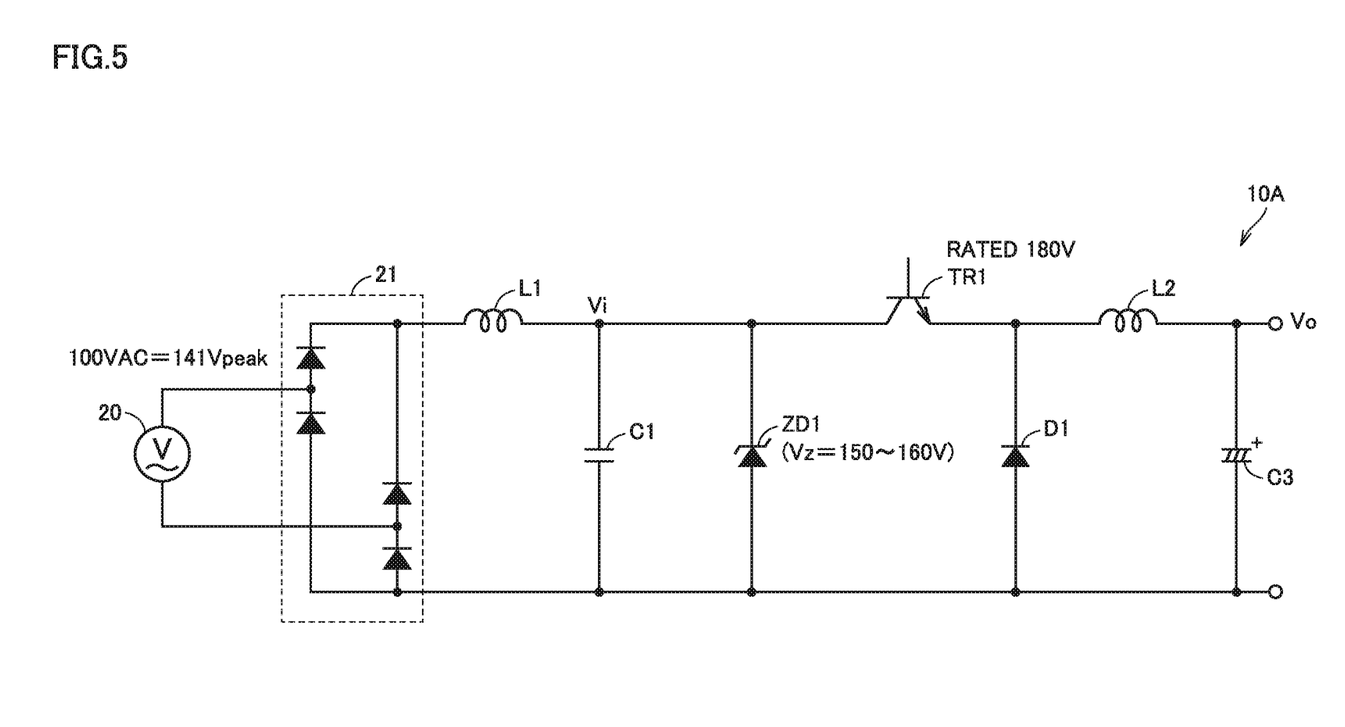
FIG. 5 is a diagram for illustrating a problem in the circuit shown in FIG. 4.

FIG. 5 is a diagram for illustrating a problem in the circuit shown in FIG. 4. It is assumed that Vz=150 V in FIG. 5. When the input voltage (voltage Vi) of power supply circuit 10A, is 141 V, Zener diode ZD1 does not operate. However, since the input voltage may change, there is always a possibility that the input voltage may exceed Zener voltage Vz.

As Zener voltage Vz is higher, the difference between the input voltage of power supply circuit 10A and. Zener voltage Vz is larger, but the difference between the rated voltage of transistor TR1 and Zener voltage Vz is smaller on the contrary. When Zener diode ZD1 has characteristic variations, Zeller voltage Vz may also he higher than the rated voltage (180 V) of transistor TR1.

For example, when the typical value of Zener voltage Vz is 160 V and the rated voltage of transistor TR1 is 180 V, there is no problem as long as the actual value of Zener voltage Vz shows a typical value. However, when the specification value of Zener voltage Vz is defined to fall within a specific range and when the upper limit of the range exceeds the rated voltage (180 V) of transistor TR1, it is conceivable that the actual value of Zener voltage Vz may possibly exceed the rated voltage of transistor TR1. When input voltage exceeds 180 V by using such a Zener diode as a surge protection element, transistor TR1 may be damaged.

<Surge Protection by Power Supply Circuit According to the Present Embodiment>

Figure 6:
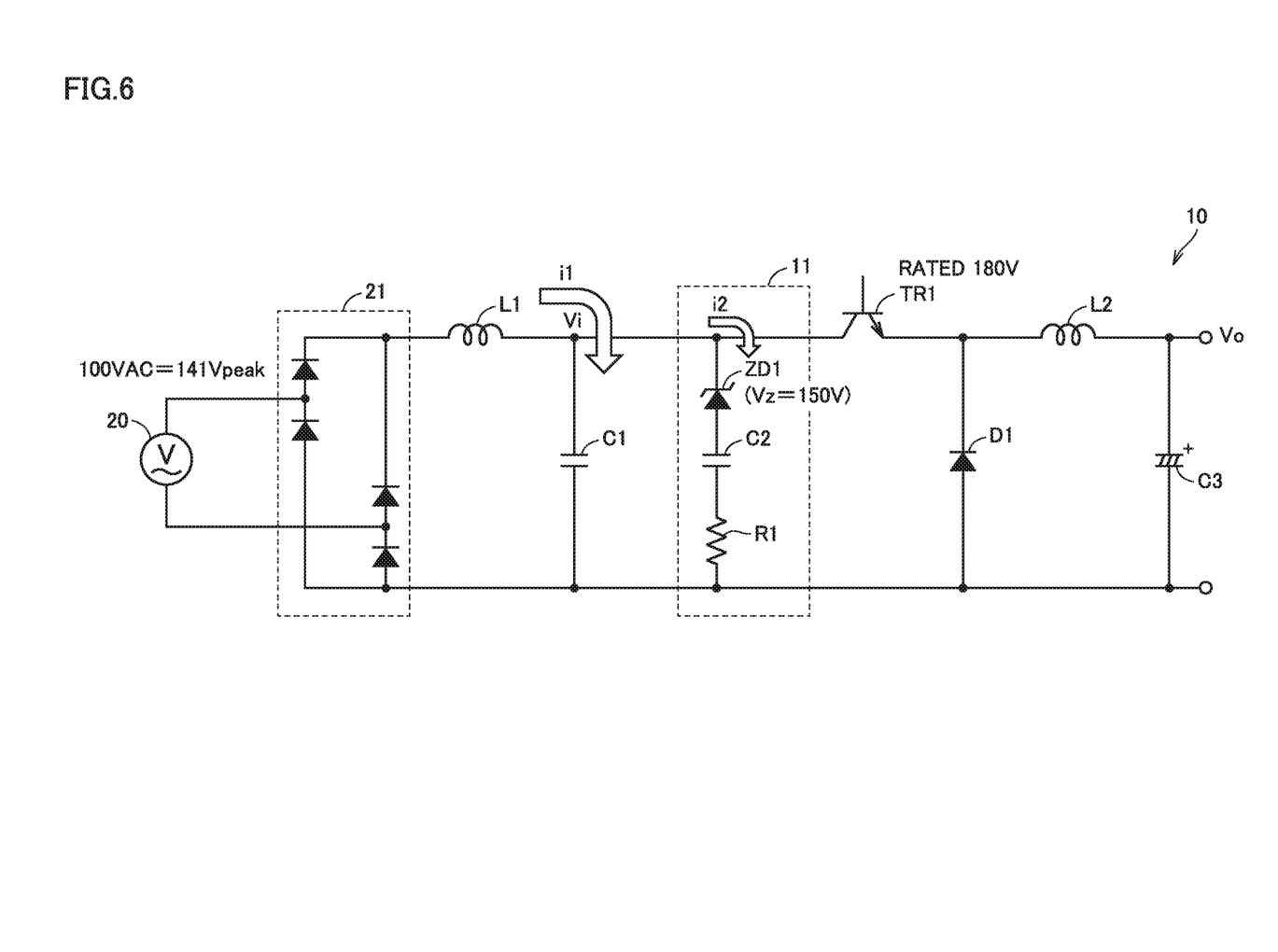
FIG. 6 is a diagram for illustrating surge protection in the power supply circuit shown in FIG. 1.

FIG. 6 is a diagram for illustrating surge protection in power supply circuit 10 shown in FIG. 1. In surge protection circuit 11, capacitor C2 and resistance R1 are connected in series to Zener diode ZD1. The operating voltage (Zener voltage Vz) of Zener diode ZD1 is assumed to be 150 V.

Current i1 flows at the start-up of power supply circuit 10. Since transistor TR1 is off, current i1 flows into capacitor C1. When voltage Vi reaches 150 V, Zener diode ZD1 operates. Thereby, a current i2 flows through Zener diode ZD1, so that capacitor C2 is charged.

Resistance R1 prevents an inrush current from flowing into capacitor C2. Since current i2 flows through resistance R1, a sudden rise of current i2 is suppressed. Accordingly, an instantaneously high current can be prevented from flowing into Zener diode ZD1. Furthermore, current i2 is sufficiently smaller than current i1. Thus, a sudden voltage rise by coil L1 is prevented.

Furthermore, when the input voltage of power supply circuit 10 rises due to fluctuations and the like, voltage Vi rises, so that current i2 increases. Capacitor C2 is charged by current i2. Capacitor C2 is higher in capacitance value than capacitor C1. Even when the input voltage rises to thereby increase current i2, the increased current flows into capacitor C2 as long as capacitor C2 is chargeable. Accordingly, a voltage rise across (between the cathode and the anode) of Zener diode ZD1 can be suppressed, so that Zener diode ZD1 can be protected.

According to the power supply circuit shown in FIG. 1, input voltage Vi can be prevented from greatly rising. Thus, the difference between the operating voltage (Zener voltage Vz) of Zener diode ZD1 and the rated voltage of transistor TR1 can be sufficiently ensured. For example, even in consideration of the variations in operating voltage of Zener diode ZD1 (for example, variations within the range of specifications), it becomes possible to increase the possibility that the operating voltage of Zener diode ZD1 is lower than the rated voltage of transistor TR1. Therefore, transistor TR1 can be protected from a surge voltage.

Furthermore, by applying Zener diode ZD1, a capacitor having a low withstand voltage is applicable as capacitor C2.

Figure 7:
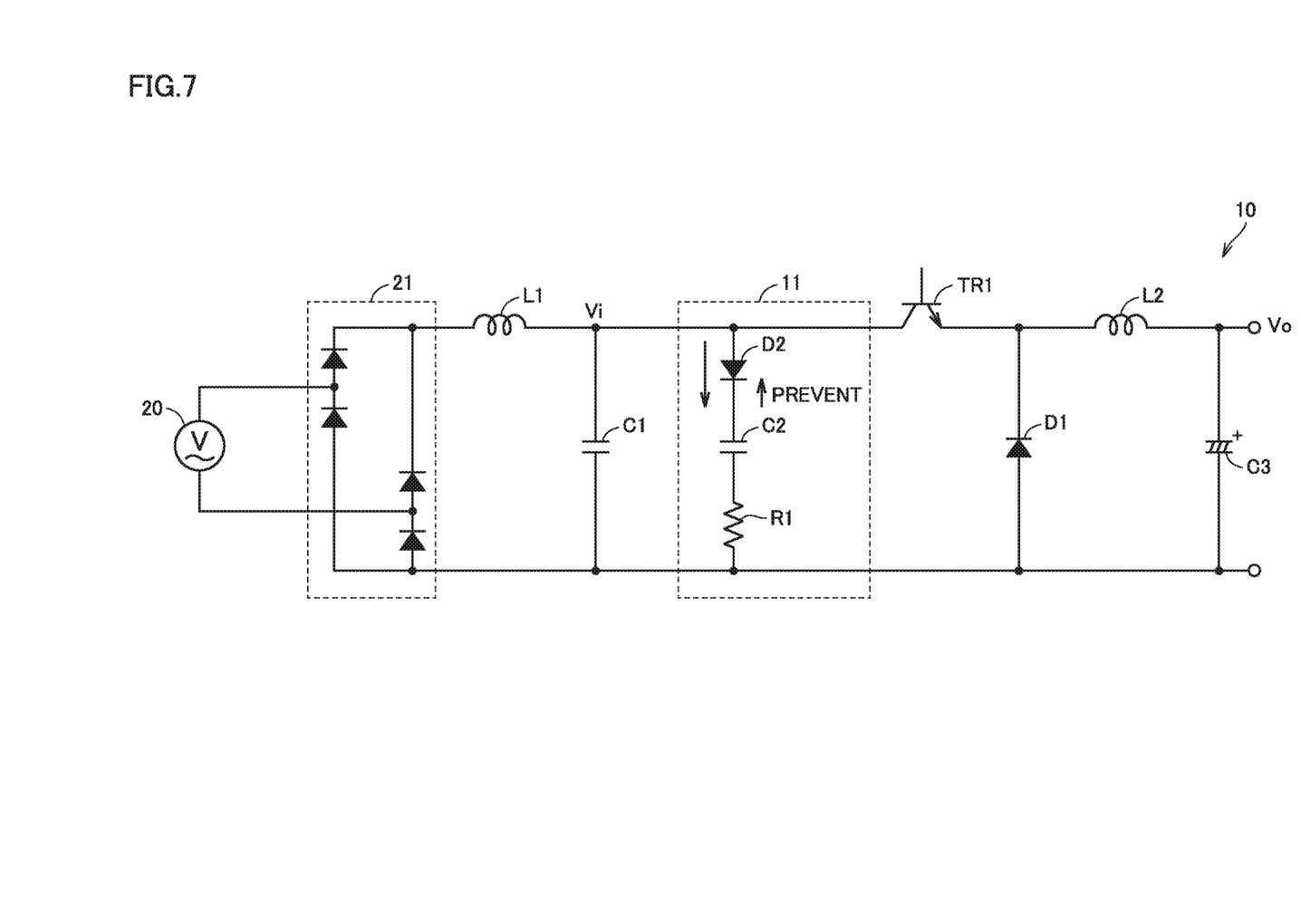
FIG. 7 is a block diagram showing a second configuration example of the power supply circuit according to the present embodiment.

FIG. 7 is a block diagram showing a second configuration example of the power supply circuit according to the present embodiment. Referring to FIG. 7, surge protection circuit 11 includes a diode D2 in place of Zener diode ZD1. In this point, the configuration shown in FIG. 7 is different from the configuration shown in FIG. 1, Diode D2 has an anode connected to the second end of coil L1. Capacitor C2 and resistance R1 are connected in series to the cathode of diode D2.

At the start-up of power supply circuit 10, voltage Vi rises and a forward current flows through diode D2. Accordingly, both capacitor C1 and capacitor C2 are charged. Thereby, a surge can be absorbed. On the other hand, transistor TR1 operates during the steady operation of power supply circuit 10. Thereby, the cathode-side voltage of diode D2 decreases relative to the anode-side voltage of diode D2. Since a reverse bias voltage is applied to diode D2, diode D2 is not brought into conduction. Thus, charging and discharging of capacitor C2 can be suppressed during the steady operation of power supply circuit 10. Furthermore, the loss caused by charging and discharging of capacitor C2 can be suppressed during the steady operation of power supply circuit 10. Therefore, surge protection circuit 11 can be prevented from influencing the operation of power supply circuit 10.

Figure 8:
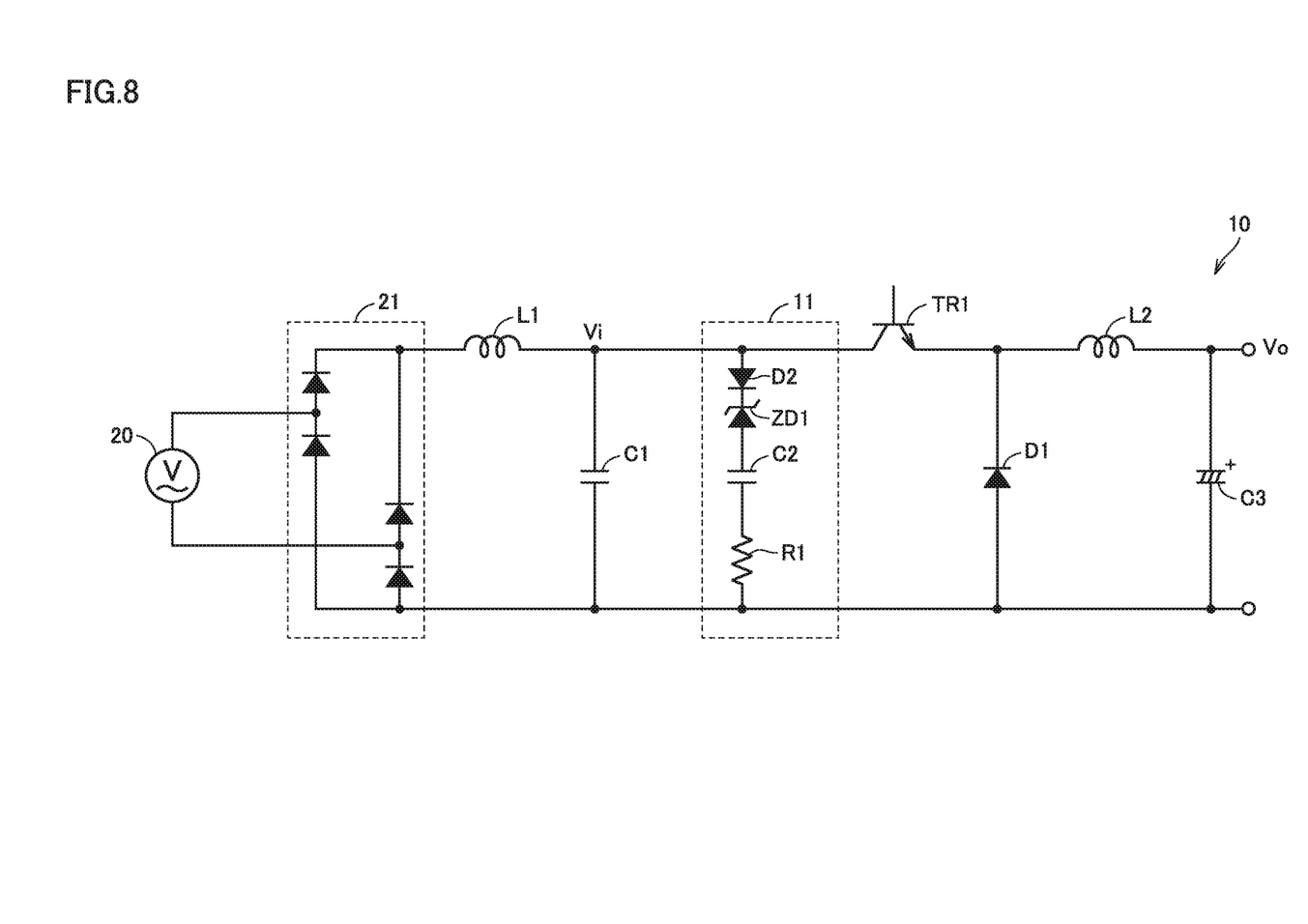
FIG. 8 is a block diagram showing a third configuration example of the power supply circuit according to the present embodiment.

FIG. 8 is a block diagram showing a third configuration example of the power supply circuit according to the present embodiment. Referring to FIG. 8, surge protection circuit 11 includes diode D2 in addition to Zener diode ZD1. In this point, the configuration shown in FIG. 8 is different from the configuration shown in FIG. 1. As in the configuration shown in FIG. 7, the anode of diode D2 is connected to the second end of coil L1. The cathode of diode D2 is connected to the cathode of Zener diode ZD1. Capacitor C2 and resistance R1 are connected in series to the anode of Zener diode ZD1.

According to the configuration shown in FIG. 8, as in the configuration shown in FIG. 1, input voltage Vi can be prevented from greatly rising, so that the difference between the operating voltage (Zener voltage Vz) of Zener diode ZD1 and the rated voltage of transistor TR1 can be sufficiently ensured. Furthermore, according to the configuration shown in FIG. 8, diode D2 can prevent surge protection circuit 11 from influencing the operation of power supply circuit 10 during the steady operation of power supply circuit 10.

[Additional Notes]

As described above, the present embodiment includes the following disclosures.

(Configuration 1)

A power supply circuit (10) comprising:
a coil (L1) having a first end that receives an input voltage and a second end;
a switching element (TR1) connected to the second end of the coil (L1);
a first capacitor (C1) connected to the second end of the coil (L1); and
a surge protection circuit (11) connected to the second end of the coil (L1) in parallel with the first capacitor (C1),
the surge protection circuit (11) including
a diode,
a second capacitor (C2), and
a resistance (R1),
the diode, the second capacitor (C2), and the resistance (R1) being connected in series to the second end of the coil (L1).

(Configuration 2)

The power supply circuit (10) according to configuration 1, wherein the second capacitor (C2) is greater in capacitance than the first capacitor (C1).

(Configuration 3)

The power supply circuit (10) according to configuration 1 or configuration 2, wherein
the diode is a Zener diode (ZD1),
the Zener diode (ZD1) has a cathode electrically connected to the second end of the coil (L1), and
the second capacitor (C2) and the resistance (R1) are connected in series to an anode of the Zener diode (ZD1).

(Configuration 4)

The power supply circuit (10) according to configuration 3, wherein an operating voltage of the Zener diode (ZD1) is lower than a rated voltage of the switching element (TR1).

(Configuration 5)

The power supply circuit (10) according to configuration 3 or configuration 4, wherein an operating voltage of the Zener diode (ZD1) exceeds a design value of the input voltage.

(Configuration 6)

The power supply circuit (10) according to configuration 1 or configuration 2, wherein the diode (D2) has an anode connected to the second end of the coil (L1).

(Configuration 7)

The power supply circuit (10) according to configuration 6, wherein
the diode (D2) has an anode connected to the second end of the coil (L1),
the surge protection circuit (11) further includes a Zener diode (ZD1), and
the Zener diode (ZD1), the second capacitor (C2) and the resistance (R1) are connected in series to a cathode of the diode (D2).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power supply circuit comprising:
a coil having a first end that receives an input voltage and a second end;
a switching element connected to the second end of the coil;
a first capacitor connected to the second end of the coil; and
a surge protection circuit connected to the second end of the coil in parallel with the first capacitor, wherein
the surge protection circuit comprises
a diode,
a second capacitor, and
a resistance, and
the diode, the second capacitor, and the resistance are connected in series to the second end of the coil.

2. The power supply circuit according to claim 1, wherein a capacitance of the second capacitor is greater than a capacitance of the first capacitor.

3. The power supply circuit according to claim 2, wherein
the diode comprises a Zener diode,
the Zener diode comprises a cathode electrically connected to the second end of the coil, and
the second capacitor and the resistance are connected in series to an anode of the Zener diode.

4. The power supply circuit according to claim 3, wherein an operating voltage of the Zener diode is lower than a rated voltage of the switching element.

5. The power supply circuit according to claim 3, wherein an operating voltage of the Zener diode exceeds a design value of the input voltage.

6. The power supply circuit according to claim 4, wherein an operating voltage of the Zener diode exceeds a design value of the input voltage.

7. The power supply circuit according to claim 2, wherein the diode comprises an anode connected to the second end of the coil.

8. The power supply circuit according to claim 7, wherein
the diode comprises an anode connected to the second end of the coil,
the surge protection circuit further includes a Zener diode, and
the Zener diode, the second capacitor and the resistance are connected in series to a cathode of the diode.

9. The power supply circuit according to claim 1, wherein
the diode comprises a Zener diode,
the Zener diode comprises a cathode electrically connected to the second end of coil, and
the second capacitor and the resistance are connected in series to an anode of the Zener diode.

10. The power supply circuit according to claim 9, wherein an operating voltage of the Zener diode is lower than a rated voltage of the switching element.

11. The power supply circuit according to claim 9, wherein an operating voltage of the Zener diode exceeds a design value of the input voltage.

12. The power supply circuit according to claim 10, wherein an operating voltage of the Zener diode exceeds a design value of the input voltage.

13. The power supply circuit according to claim 1, wherein the diode comprises an anode connected to the second end of the coil.

14. The power supply circuit according to claim 13, wherein
- the diode comprises an anode connected to the second end of the coil,
- the surge protection circuit further includes a Zener diode, and
- the Zener diode, the second capacitor and the resistance are connected in series to a cathode of the diode.

* * * * *